United States Patent [19]

Maeda et al.

[11] Patent Number: 5,434,905
[45] Date of Patent: Jul. 18, 1995

[54] DIGITAL CORDLESS TELEPHONE SET OPERATED UNDER BURST SYNCHRONIZATION

[75] Inventors: Kazuo Maeda; Masayasu Fujino; Jun Yang; Kiyoshi Tanaka, all of Ichikawa, Japan

[73] Assignee: Uniden Corporation, Japan

[21] Appl. No.: 159,661

[22] Filed: Nov. 30, 1993

[51] Int. Cl.⁶ .................. H04Q 7/22; H04M 11/00
[52] U.S. Cl. .......................... 379/61; 379/58; 379/63; 370/105.4
[58] Field of Search ............ 379/59, 61, 63, 58; 455/83, 33.1, 54.1; 375/8, 365; 370/95.1, 95.3, 105.4

[56] References Cited

U.S. PATENT DOCUMENTS

| | | | |
|---|---|---|---|
| 4,903,257 | 2/1990 | Takeda et al. | 455/83 |
| 5,020,130 | 5/1991 | Grube et al. | 379/63 |
| 5,297,203 | 3/1994 | Rose et al. | 379/61 |
| 5,319,634 | 6/1994 | Bartholomew et al. | 379/61 |

FOREIGN PATENT DOCUMENTS

| | | |
|---|---|---|
| 55-153436 | 11/1980 | Japan . |
| 58-6634 | 1/1983 | Japan . |
| 3-69218 | 3/1991 | Japan . |
| 3-270333 | 12/1991 | Japan . |
| 5-48513 | 2/1993 | Japan . |

*Primary Examiner*—Curtis Kurtz
*Assistant Examiner*—William G. Trost
*Attorney, Agent, or Firm*—Ratner & Prestia

[57] ABSTRACT

A cordless telephone set comprises a base unit and a handset unit connected by a radio frequency (RF) link which is established by digital burst data transmission and is synchronized by a unique word which is included in the digital burst data. The radio transmission signal is not continuous and it requires the synchronization. The unique word is detected by the unique word detecting means and is used to establish the burst data synchronization. The unite word consists of frequency channel information and fixed unite data. By using this information, the base unit and the handset unit are prevented from trying to establish a radio link at incorrect frequency when a spurious signal, not intended for the base unit and/or handset unit is erroneously received.

8 Claims, 7 Drawing Sheets

T : TRANSMISSION
R : RECEPTION

P : PREAMBLE BITS
UW : UNIQUE WORD
S : STATUS BITS
I : INFORMATION DATA
CHK : CHECK BITS
G : GUARD BITS

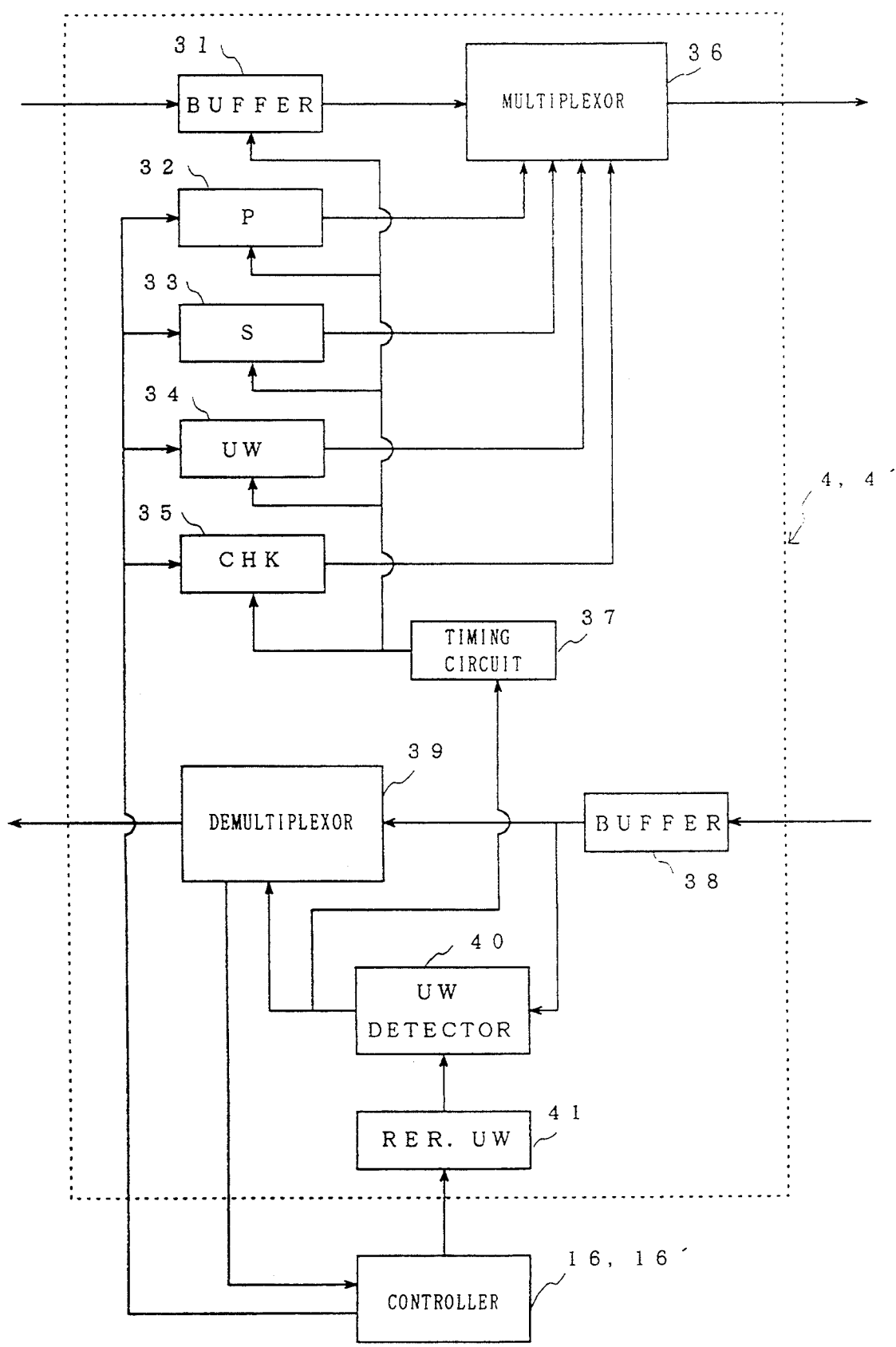
F I G. 6

DIGITAL CORDLESS TELEPHONE SET OPERATED UNDER BURST SYNCHRONIZATION

BACKGROUND OF THE INVENTION

Field of the Invention

This invention relates to a cordless telephone set, and particularly relates to a digital cordless telephone set which requires a synchronization to digital burst transmission data such as TDM (Time Division Multiplex) data.

Description of the Prior Art

A digital cordless telephone set comprises a base unit which may be connected to a telephone network and a battery-powered handset unit which is connected by a radio frequency (RF) link to the base unit. The RF link is established by sending and receiving a digitally modulated signal between the base unit and the handset unit.

Most digital cordless phones use multiple channels by various multiplexing methods. TDM is one of these methods in which a short transmission data burst is assigned to one of several time frames. TDD (Time Division Duplex) which is also known as Ping-Pong transmission, is an example of TDM which has an advantage of using only one frequency channel for transmitting and receiving. FIG. 1 shows an example of a burst assignment in Ping-Pong transmission between the base unit and the handset unit. As shown in this Figure, the channel is alternately used to transmit and receive respective data signals.

FIG. 2 shows an example of the burst transmission data stream consisting of preamble bits (P), unique word (UW), status bits (S), information data (I), check bits (CHK) and guard bits (G). The preamble bits are used for bit clock recovery, the unique word is used for frame synchronization and the status bits are used for associated control data communication. The information data includes digital voice data and control data, and the check bits are usually used to detect bit errors in the burst frame. The guard bits are empty bits which are used to prevent overlap between the transmitting frame timing and the receiving frame timing.

For an exemplary prior-art cordless phone, the frame synchronization should be established before communication is started. The frame synchronization is established using the unique word.

The receiver first recovers the bit clock from the preamble bits (bit length Lp), the pattern of the preamble bits is, for example, the repetition of "1" and "0" as used in FSK and PSK schemes. The received burst data is sampled in the clock timing determined by the bit clock to output the data.

Next, the receiver locates the unique word (bit length Lu) in the received burst data. Once the unique word is detected, the receiver recognizes that the data after the unique word are the status bits and the information data, and the starting point of the received burst data. That is to say the timing for receiving the burst data is the instant which is (Lp+Lu) bits before the first one of the status bits. The receiver also recognizes that the time for transmitting the burst data is one burst frame length after the beginning of receive timing. Following the scheme, the receiver knows the correct timing to send transmission burst data. In this manner, the frame synchronization is established.

In a normal operation of the digital cordless telephone set, when the transmitter, for example, the base unit, sends burst data at a frequency of F1, the handset unit is going to receive the burst data while scanning frequency channels in order to communicate with the base unit at the frequency of F1.

However, cordless phones are used at various location. Occasionally, the handset unit is located very near to the base unit. In this case, the transmission data may be received at an incorrect frequency because the strength of the signal received at the base station is much greater than during normal operation of the cordless phone. This incorrect reception is one type of spurious reception. Another type of spurious reception is an image reception which occurs in a heterodyne receiving system. Spurious reception may cause problems because, if the cordless phone receives the signal at the incorrect frequency, it will send the transmission data at the incorrect frequency and will never establish the radio link.

For example, if the base unit sends transmission data using TDD at a frequency of F1, and the handset unit receives this data at a frequency of F2 due to spurious reception, the handset will send reply data at the frequency of F2. The base unit is waiting for the reply at the frequency of F1, however, and will newer receive the reply.

Furthermore, such misconnection at a different frequency may interfere with other communications. In the example presented above, this interference would be with another cordless telephone operating at frequency F2.

SUMMARY OF THE INVENTION

Accordingly it is an object of the present invention to prevent a digital cordless telephone from failing to establish a connection due to spurious reception of signals at an improper frequency.

It is an another object of the present invention to provide a digital cordless telephone set without spurious reception at an improper frequency.

Each controller of the base unit and the handset unit sets a unique word in its transmitted data. This unique word includes the channel frequency information which shows a frequency to be used to communicate between the base unit and the handset unit, the remaining portion of the unique word is a fixed pattern. The unique word is programmable by the controller.

The base unit and the handset unit may recognize, based on the unique word, whether or not the received signal is a desired signal at a correct frequency. As a result, the digital cordless telephone may prevent spurious receptions.

The digital cordless telephone set according to the present invention comprises frequency, channel selecting means for selecting a frequency channel for communication, unique word generating means for generating a unique word including fixed pattern bits and frequency channel information bits determined by the frequency channel that is selected by the frequency channel selecting means, burst data stream transmitting means for transmitting a burst data stream including the unique word, burst data stream receiving means for receiving the burst data stream transmitted from the burst data stream transmitting means, reference unique word setting means for setting a reference unique word based on the frequency channel selected by the frequency selecting means, unique word detecting means for detecting the unique word from the received burst data stream by comparing the reference unique word set by the reference unique word setting means with the received, burst data stream, and burst frame synchronization means for generating timing signals to synchronize the received burst data stream and for extracting information data including control data and voice data from portions of the burst data stream following the unique word.

BRIEF DESCRIPTION OF THE DRAWINGS

FIG. 6 is a block diagram of the framer circuit shown in FIGS. 3 and 4.

DESCRIPTION OF THE EXEMPLARY EMBODIMENTS

Figure 1:
FIG. 1 is a timing diagram which shows a burst assignment in Ping-Pong transmission between the base unit and the handset unit.
Figure 1:
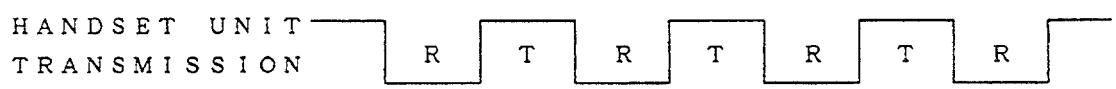
Figure 2:
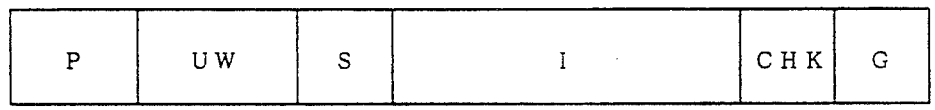
FIG. 2 is a bit allocation diagram which shows an example of the burst transmission data stream.
Figure 3:
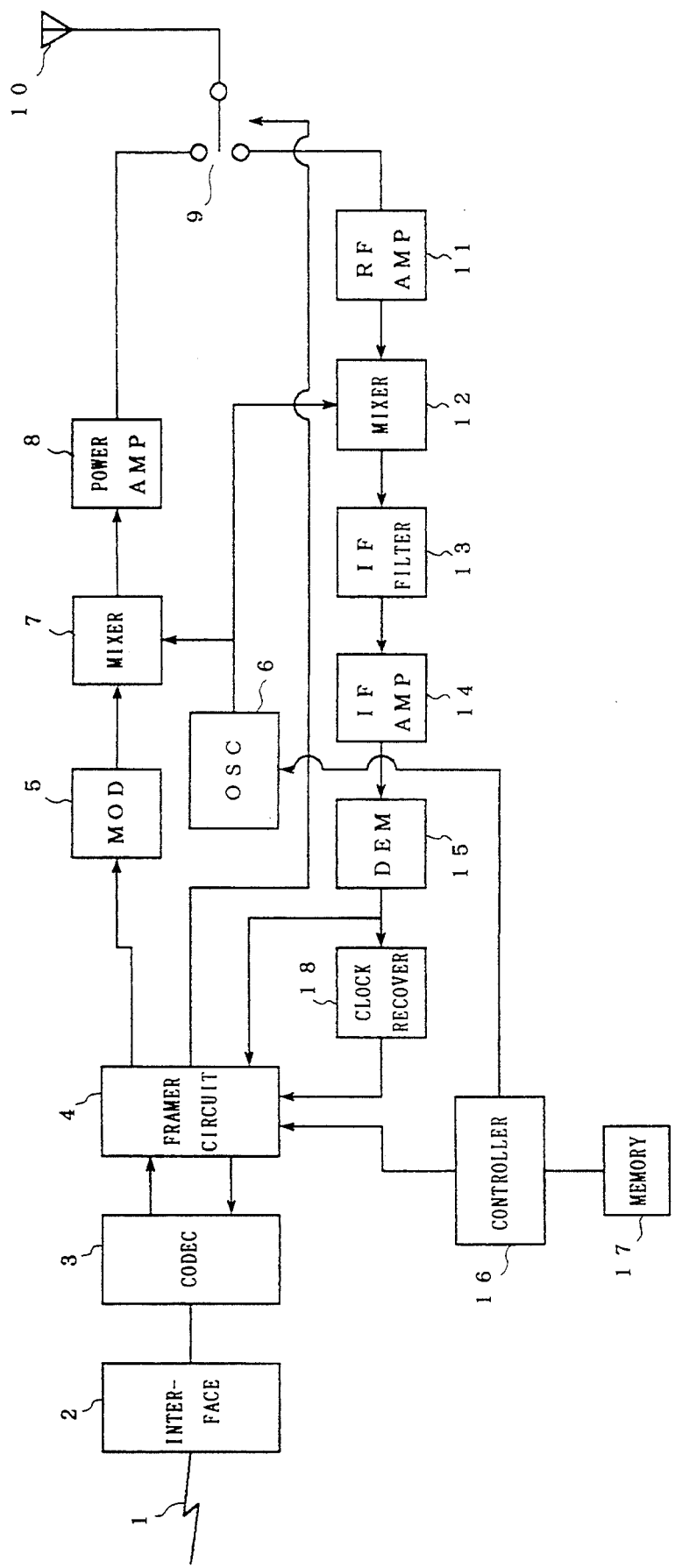
FIG. 3 is a block diagram of the base unit of the cordless telephone set.
Figure 4:
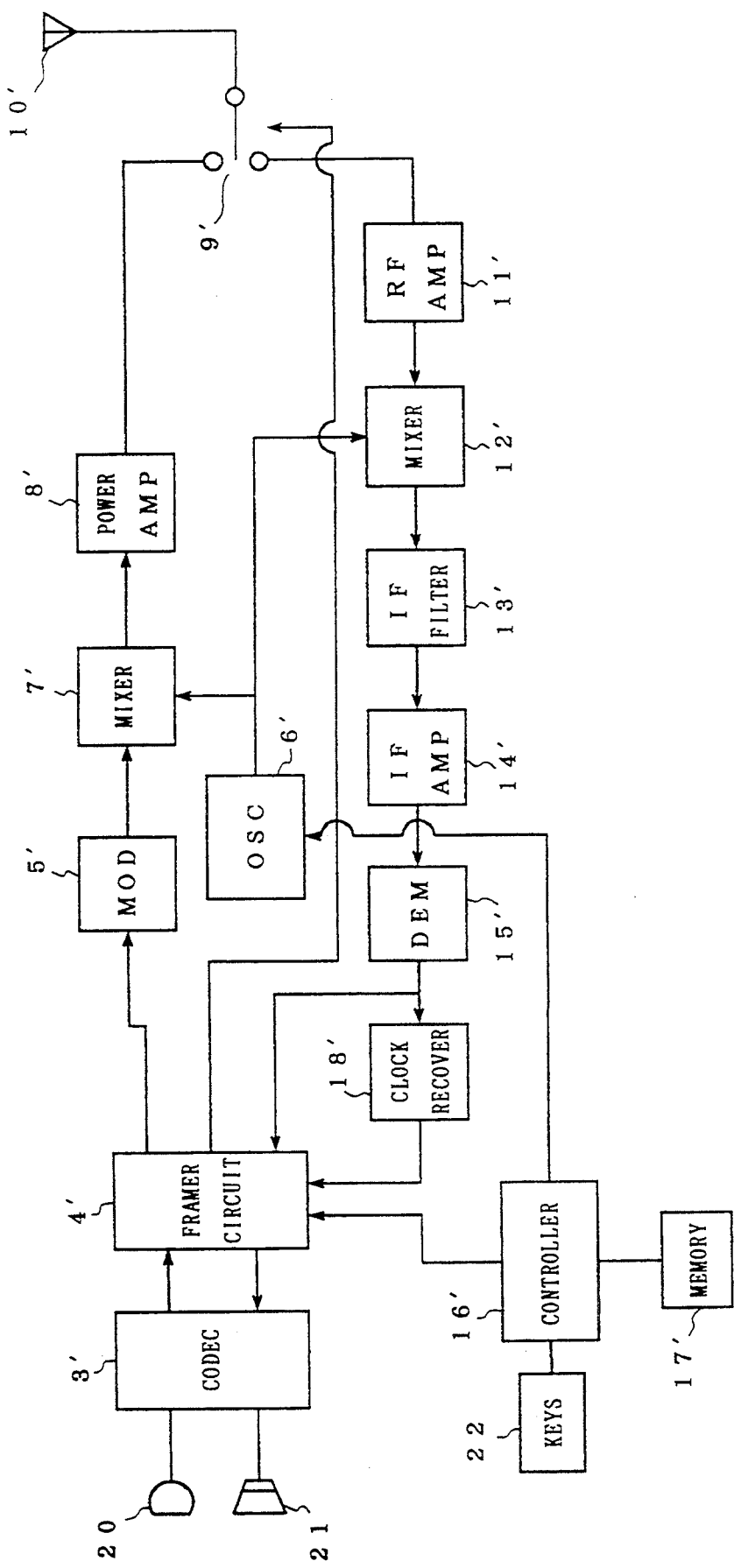
FIG. 4 is a block diagram of the handset unit of the cordless telephone set.

FIGS. 3 and 4 show respectively the base unit and the handset unit of the digital cordless telephone set using TDD. The base unit and the handset unit have substantially the same construction, so the same element is denoted by the same reference number in both figures, but the reference numerals in FIG. 4 are primed.

Figure 5:
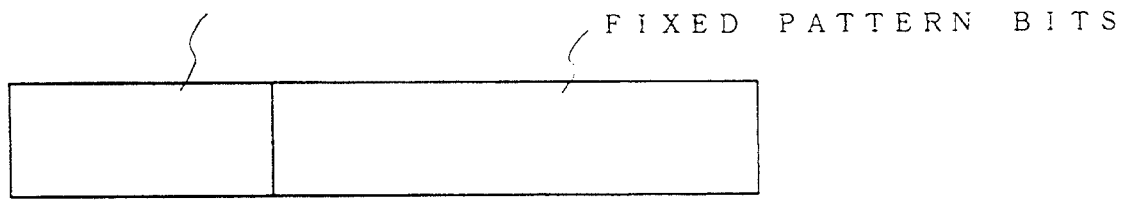
FIG. 5 is a bit allocation diagram which shows the format of the unique word.

In the base unit shown in FIG. 3, the analog voice signal from a telephone network line 1 provided through an interface 2, is changed to a digital voice signal by the voice CODEC 3. Then, the preamble data, unique word, status data and check bits are added serially to the digital voice signal by the framer circuit 4. Exemplary circuitry suitable for use as the frame circuit 4 is described below with reference to FIG. 6. This circuit may be, for example, a multiplexor/demultiplexor. The signal produced by the framer circuit 4 is baseband transmission data. The unique word, which is added to this data by the framer circuit, consists of the frequency channel information bits and the fixed pattern bits as shown in FIG. 5.

The frequency channel information bits indicate the frequency used to communicate between the handset unit and the base unit, and the pattern of these bits is different for each frequency channel. On the other hand, the pattern of the fixed pattern bits is the same for all frequency channels. The frequency channel information bits in each frequency channel are determined by the frequency channel information stored for each channel in the memory 17.

When the base unit shown in FIG. 3 is going to communicate with the handset unit, the controller 16 reads, from the memory 17, the frequency channel information which corresponds to the frequency channel to be used in communication. The controller 16 sends that frequency channel information to the framer circuit 4.

The framer circuit 4 sets the unique word based on the frequency channel information sent from the controller 16. The framer circuit 4 may speed up the bit rate, for example the input data of 100 kbit/sec is changed to 300 kbit/sec baseband transmission data. The baseband transmission data is an intermittent signal which occupies one-half of the burst frame cycle, the other-half of the burst frame cycle is used for reception. The baseband transmission data is modulated by the modulator 5, heterodyned up to the RF frequency with the local oscillator signal from the local oscillator 6 by the mixer 7, and then amplified by the radio frequency (RF) power amplifier 8. Finally, the RF signal goes through the antenna switch 9 and is transmitted from the antenna 10. The antenna switch 9 is interchangeably switched between transmitting and receiving modes based on a TX/RX control signal from the framer circuit 4, the TX/RX control signal is generated based on the frame synchronization. The framer circuit 4 and the local oscillator 6 are controlled by the controller 16.

In the receive half cycle of the burst frame, the signal received by the antenna 10 goes through the antenna switch 9 and is amplified by the front-end amplifier 11. Then, it is mixed with the local oscillator signal from the local oscillator 6 in the mixer 12 to produce an intermediate frequency (IF) signal. The IF signal is filtered by the IF filter 13 and amplified by the IF amplifier 14. The amplified IF signal is input to the demodulator 15. The demodulator 15 demodulates the IF signal to recover the baseband receive data and outputs this data to the framer circuit 4 and the clock recovery circuit 18.

The framer circuit 4 detects the unique word from the baseband receive data, and makes use of the frequency information it contains to match the receiving frequency with the correct frequency to be received in order to avoid the reception of an incorrect frequency. The framer circuit may reduce the bit rate, for example the 300 kbit/sec baseband received data is changed into the 100 kbit/sec received voice data.

As described hereinbefore, the clock recovery circuit 18 recovers the bit clock based on the preamble bits having the bit pattern of "1" and "0" repetition for example, and outputs the bit clock to the framer circuit 4. In the framer circuit 4, the received data is processed based on the clock timing set by the bit clock.

If the framer circuit 4, based on information in the unique word, recognizes that the correct frequency has been received, frame synchronization is established, and the digital voice signal is output from the framer circuit 4 in synchronization mode. The digital voice signal is input to the CODEC 3, and the CODEC changes the digital voice signal into the analog voice signal. The analog voice signal is sent to the telephone network line 1 through the interface 2.

The handset unit shown in FIG. 4 comprises a microphone 20 and a speaker 21 in place of the interface 2 of FIG. 3, and further comprises a keypad. The microphone 20 and the speaker 21 are connected to CODEC 3' and the keypad 22 is connected to the controller 16'. The operation of the handset unit is substantially the same as that of the base unit shown in FIG. 3, so the description thereof is omitted.

FIG. 6 shows the construction of the framer circuit 4 of the base unit. The transmitting section of the framer circuit 4 comprises a buffer 31, a preamble bit generator 32, a status bit generator 33, a unique word generator 34, a check bit generator 35, a multiplexor 36 and a timing circuit 37. The receiving section of the framer circuit 4 comprises a buffer 38, a demultiplexor 39 and a unique word detector 40.

The construction of the framer circuit 4' of the handset unit is the same as that of the framer circuit 4. Therefore, the operation of only the framer circuit 4 is now described.

In the transmitting mode, the voice data from the CODEC 3 is first stored in the buffer 31. The voice data from the buffer 31, the preamble bits from the preamble bit generator 32, the status bits from the status bits generator 33, the unique word from the unique word generator 34 and the check bits from the check bit generator 35 are multiplexed in the multiplexor 36 to produce a frame of data ,to be transmitted. At this time, respective output timings of the buffer 31 and the generators 32-35 are controlled by the timing circuit 37. The timing circuit 37 is driven by a signaling output pulse from the unique word detector 40, described below.

In the receiving mode, the baseband data from the demodulator 15 is first stored in the buffer 38, and then is input to the demultiplexor 39 and the unique word detector 30. The unique word detector 40 detects the unique word included in the received baseband data and compares the detected unique word with the reference unique word 31 set by the controller 16 as described above.

The unique word detector 40 outputs a signaling pulse to the demultiplexor 39 and, to the timing circuit 37 when a matching unique word is detected as the reference unique word in the comparison.

Upon receipt of the signaling pulse from the unique word detector 40, the demultiplexor 39, in frame synchronization mode, extracts the information data including the digital voice data and the control data from the received baseband data and outputs it to the CODEC 3. The demultiplexor 39 also extracts the status bits and outputs them to the controller 16.

The operation of the cordless telephone system as shown in FIGS. 3, 4, and 6 is now described in detail from an off-hook condition to the first data transfer.

When the off-hook key in the keypad 22 of the handset unit is depressed, the controller 16' recognizes that the off-hook key has been depressed and selects one of several frequency channel information words stored in the memory 17'. The number of frequency channel information words corresponds to the number of frequency channels which may be used in communication, for example 16 channels.

The controller 16' provides the oscillation frequency data to the local oscillator 6' based on the selected frequency channel information in order to set the oscillation frequency of the local oscillator 6'. The controller 16' also provides the information on the selected frequency channel to the unique word generator 34. The unique word generator 34 generates the unique word consisting of the channel information bits and the fixed pattern bits, the channel information bits being formed by the information on the selected frequency channel.

The controller 16' instructs the status bit generator 33 to place the information which shows the off-hook status of the handset unit into the status bits. The framer circuit 4' generates the remaining burst data including the unique word and the status bits other than the preamble bits, the information data, the check bits and the guard bits. The handset unit then sends this burst data to the base unit.

In the base unit, a plurality of receiving frequency channels are scanned in turn. This scanning is performed in such a manner that: the controller 16 reads the first frequency channel information word from the memory 17, and then sets the oscillation frequency of the local oscillator 6 and the reference unique word 41 consisting of the frequency channel information bits and the fixed pattern bits based on the read frequency channel information word. The base unit receives the signal at the first frequency channel for a predetermined time period and determines if the received signal has the same unique word as the reference unique word. If the channel information read from the memory 17 of the base unit and the channel information read from the memory read 17' of the handset unit are the same, the unique word sent from the handset unit matches the reference unique word set in the base unit. When the received unique word does not match the reference unique word, the base unit scans the next frequency channel.

When the base unit detects the same unique word as the reference one during the scanning operation, the base unit stops the scanning operation and establishes the frame synchronization before the communication is started.

After such frame synchronization is established, the status bits extracted by the demultiplexor 39 are applied to the controller 16, the status bits include the information for the off-hook status of the handset unit.

The controller 16 of the base unit knows that the hand set has been placed in an off-hook state from the extracted status bits, and causes the telephone line 1 to be placed in on off-hook state. As a result, the base unit may begin sending data to the handset unit in frame synchronization mode.

As described above, according to the preferred embodiments the burst frame synchronization may be established by receiving the same unique word as the reference one. After the burst frame synchronization has been established, the base unit and the handset unit may communicate with each other at the correct frequency.

In general, the unique word has relatively long bit length to prevent from mistaking a noise signal for the unique word. It is therefore very useful to adopt an idea of bit error detection for allowing bit errors in the unique word. Using this technique, the unique word detector 40 may recognize a unique word and output the signaling pulse, even if there is a one bit error in the unique word. If the unique word detector 40 comprises an error-correcting system and the unique word is coded using an error-correcting code, depending on the code that is used, two or more erroneous bits may be allowed for the unique word.

When an error-correcting code (ECC) is used, the controller 16 (16') ECC encodes the channel information read from the memory 17 (17'). The unique word comprises ECC encoded channel information bits plus the fixed pattern bits. Such unique word is detected by a unique word detector having an error-correcting ability.

Figure 7:
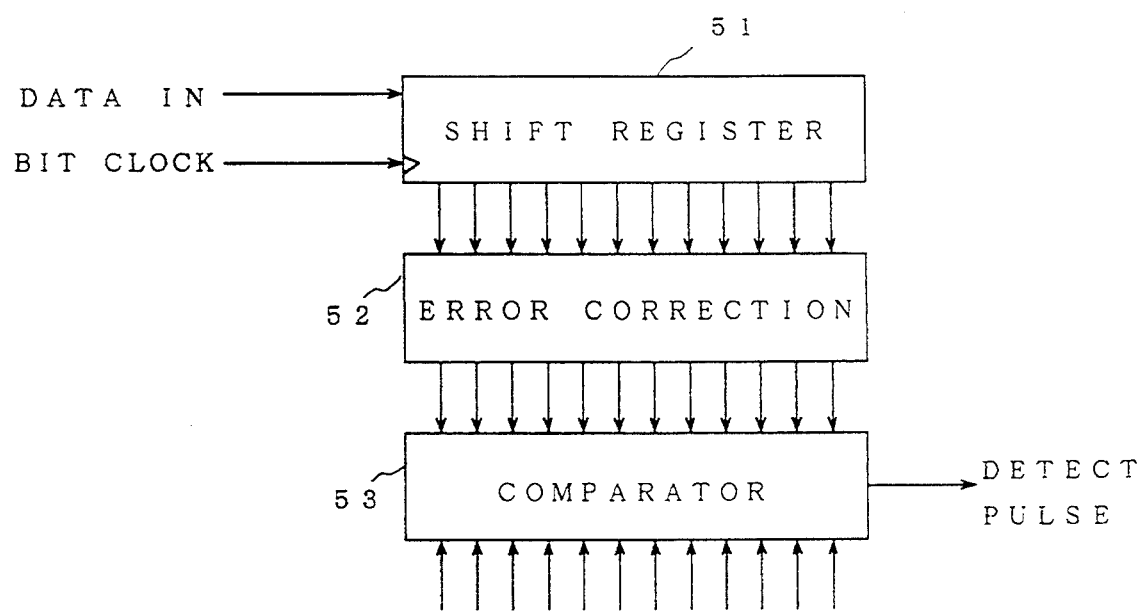
FIG. 7 is a block diagram of an exemplary unique word detector.

FIG. 7 shows one example of such unique word detector. This unique word detector comprises a shift register 51, an error-correction circuit 52 and a comparator 53.

The received baseband data is input in series into the shift register 51. In the shift register 51, the data is shifted bit by bit based on the bit clock, and the data in the shift register is output in parallel to the error correction circuit 52. The circuit 52 corrects bit errors in the data and provides the error-corrected data to the comparator 53.

At the same time, the ECC encoded reference unique word is delivered to the comparator 53 from the controller. The data and the reference unique word are compared in the comparator 53. When the comparator detects the coincidence of the data and the reference unique word, a detection pulse or a signaling pulse is output.

An example of the error-detecting encoded unique word is now described. It is assumed in the following that the number of frequency channels is, at most, 16. In this case, the frequency channel information bits of the unique word may consist of 4 bits of binary coded data. The frequency channel information for channel 5 for example, is expressed as "0101". One method for error-correcting encoding the frequency channel information is to use Hamming code formed by generator polynomial $G(X) = X^3 + X + 1$. For example, error-correcting encoding using Hamming code to the frequency channel information "0101" for channel 5 results in 7 bits data of "0100111".

The fixed pattern of 15 bits data, "111100010011010" as an example is added to the error-correcting encoded frequency channel information bits of "0100111", resulting in 22 bits unique word of "0100111111100010011010". It should be noted that the fixed pattern may be considered to be essentially ECC encoded, because the number possible fixed patterns may be limited to a small number, such as 4 or 5. Therefore, it is unnecessary to separately ECC encode the fixed pattern.

The frame synchronization, described above, using a unique word which includes frequency information can be applied to a digital cordless telephone set using spread spectrum transmission techniques.

Figure 8:
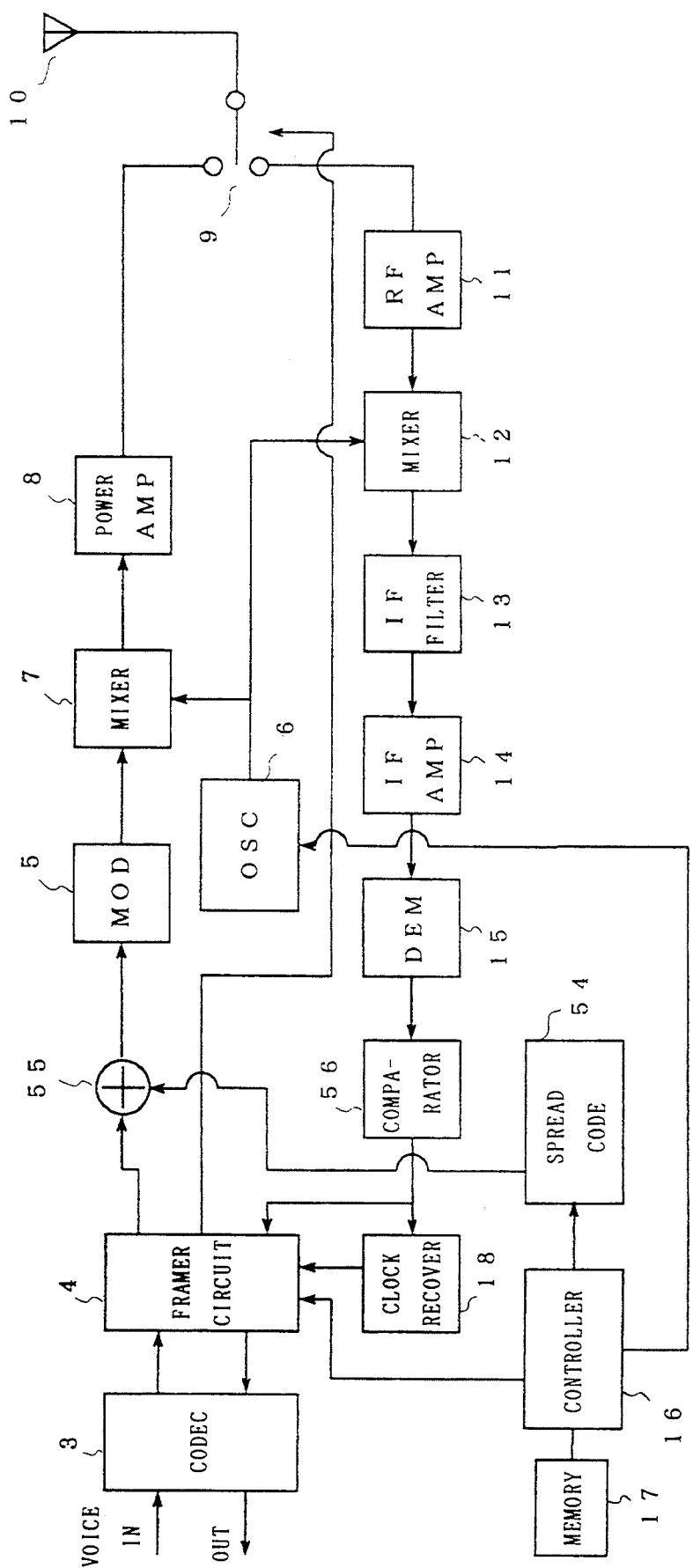
FIG. 8 is a block diagram of an alternative embodiment of the base or handset unit using a spread spectrum scheme.

FIG. 8 shows an example of the same portions of the base unit and the handset unit of a digital cordless telephone set using direct spread spectrum scheme. The construction in FIG. 8 is the same as that shown in FIG. 3 except the portions of spectrum spread and spectrum de-spread, i.e. the spread code generator 54, the exclusive OR circuit 55 and the comparator 56. Other elements are denoted by the same reference numerals in FIG. 3.

In the transmitter, the baseband data from the framer circuit 4 and the spread code from the spread code generator 54 are exclusive ORed in the exclusive OR circuit 55. The length of one spread code and the time duration of one bit of the baseband data from the framer circuit 4 are generally equal to each other, so that one spread code sequence corresponds in time to one bit of the data from the framer circuit 4. As a result of which, the exclusive ORed data supplied to the modulator 5 has the higher data rate than that of the data from the framer circuit 4 by the number of positions of the spread code sequence. The modulated output data from the modulator 5, therefore, is a signal which has been spread in spectrum.

In the receiver, the demodulated output data from the demodulator 15 is compared with the spread code from the spread code generator 54 in the comparator 56. If the detected code is the same as or similar to the spread code, the comparator 56 outputs the baseband data to the framer circuit 4 and the clock recovery circuit 18.

In this embodiment, it is possible to establish the frame synchronization using the unique word as described in FIGS. 3, 4 and 6.

If the spread code may be changed based on the frequency channel information from the controller 16, it is also possible to establish the frame synchronization using the spread code in place of the unique word. In this case, the spread code is made programmable by the controller 16 in order to change the spread code based on the frequency channel information read from the memory 17. For example, the controller 16 sets the local oscillator 6 to channel 1 and then assigns the PN-A sequence to the spread code. In the same way channel 2 may be assigned the PN-B sequence, and so on for the remaining channels.

In this system, when the spread code set in the transmitter and the spread code set in the receiver are matched, the frame synchronization is established and then the communication link is established at a correct frequency. When both of the spread codes do not match because of spurious reception at an incorrect frequency, the receiver, based on the mismatch, may prevent the spurious reception.

When frequency hopping is used as a spectrum spread scheme, the controller may store the spread code, set the frequency of the local oscillator based on the spread code, and write the frequency channel information into the unique word. This system may be implemented in the digital cordless telephone set shown in FIGS. 3 and 4.

The invention claimed is:

1. A digital cordless telephone set having a base unit which includes a terminal connected to a telephone network line and a battery-powered handset unit, each of the base unit and the handset unit comprising, frequency channel selecting means for selecting a frequency channel for communication, frequency channel information generating means for generating digitally encoded frequency channel information indicating a frequency to be used as the frequency channel selected by the frequency channel selecting means, frequency channel information transmitting means for transmitting the digitally encoded frequency channel information generated by the frequency channel generating means, frequency channel information receiving means located in the base unit and in the handset unit for receiving the digitally encoded frequency channel information transmitted from the frequency channel information transmitting means of the handset and base unit, respectively, reference frequency channel information setting means for setting reference frequency channel information based on the frequency channel selected by the frequency channel selecting means, frequency channel information detecting means for detecting when the reference frequency channel information matches the digitally encoded frequency channel information received by the frequency channel information receiving means, and burst frame synchronization establishing means for establishing burst frame synchronization using a unique word in a burst data stream, wherein the digitally encoded frequency channel information is included in the unique words transmitted by the base unit and the handset unit respectively: and the burst frame synchronization is established when the digitally encoded frequency channel information detected by the frequency channel information detecting means matches the reference frequency channel information.

2. A digital cordless telephone set according to claim 1, wherein the unique word includes bits corresponding to the digitally encoded frequency channel information and fixed pattern bits.

3. A digital cordless telephone set having a base unit which includes a terminal connected to a telephone network line and a battery-powered handset unit, each of the base unit and the handset unit comprising,
frequency channel selecting means for selecting a frequency channel for communication,
unique word generating means for generating a unique word including fixed pattern bits and frequency channel information bits determined by the frequency channel selected by the frequency channel selecting means,
burst data stream transmitting means for transmitting a burst data stream including the unique word,
burst data stream receiving means located in the handset unit and in the base unit for receiving the burst data stream transmitted from the burst data stream transmitting means of the base unit and handset unit, respectively,
reference unique word setting means for setting a reference unique word based on the frequency channel selected by the frequency selecting means, wherein the digitally encoded frequency channel information is included in the unique words transmitted by the base unit and the handset unit respectively:
unique word detecting means for detecting the unique word from the received burst data stream by comparing the reference unique word set by the reference unique word setting means with the received burst data stream, and
burst frame synchronization means for generating timing signals to synchronize the received burst data stream and for extracting information data including control data and voice data from portions of the burst data stream following the unique word, wherein the burst frame synchronization is established when the digitally encoded frequency channel information detected by the unique word detecting means matches the reference unique word information.

4. A digital cordless telephone set according to claim 3, wherein the unique word consists of frequency channel information bits determined by the frequency channel information bits and the fixed pattern bits.

5. A cordless telephone set according to claim 3 or 4 wherein,
the frequency channel information bits are encoded using an error-correcting code, and
the unique word detecting means comprises an error correction circuit for correcting errors in the received burst data stream before the burst data is compared with the reference unique word.

6. A digital cordless telephone set according to claim 3 further comprising,
spread code generating means for generating a spread code sequence having a plurality of positions,
data spreading means for assigning, to each position in the spread code sequence, a respective baseband data bit, and
data de-spreading means for changing the received burst data stream into the baseband data by comparing the burst data stream with the spread code sequence.

7. A digital cordless telephone set according to claim 6 wherein the spread code sequence is encoded based on the frequency channel provided by the frequency channel selecting means.

8. A digital cordless telephone set comprising:
a hand set unit including:
frequency channel selecting means for selecting a frequency channel for communication,
frequency channel information generating means for generating digitally encoded frequency channel information indicating a frequency to be used as the frequency channel selected by the frequency channel selecting means, and
frequency channel information transmitting means for transmitting the digitally encoded frequency channel information generated by the frequency channel generating means; and
a base unit including:
frequency channel information means for receiving the digitally encoded frequency channel information transmitted from the hand set unit,
reference frequency channel information setting means for setting reference frequency channel information based on the received digitally encoded frequency channel information, and
means for establishing burst frame synchronization between the base unit and the handset unit if the received digitally encoded frequency channel information corresponds to the reference frequency channel information.

* * * * *